GEORGE B. FOWLE.

Improvement in Leather-Slickers.

No. 127,756.  Patented June 11, 1872.

Witnesses.  George B. Fowle.
S. N. Piper.
  by his attorney.

127,756

UNITED STATES PATENT OFFICE.

GEORGE B. FOWLE, OF BOSTON, MASSACHUSETTS.

IMPROVEMENT IN LEATHER-SLICKERS.

Specification forming part of Letters Patent No. 127,756, dated June 11, 1872.

*To all persons to whom these presents may come:*

Be it known that I, GEORGE B. FOWLE, of Boston, in the county of Suffolk and State of Massachusetts, have invented a new and useful or Improved Manufacture of Leather-Figuring Tool; and do hereby declare the same to be fully described in the following specification and represented in the accompanying drawing, of which—

Figure 1:
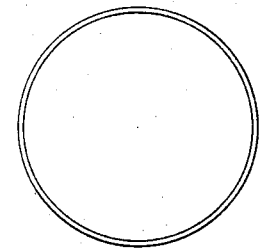
Figure 2:
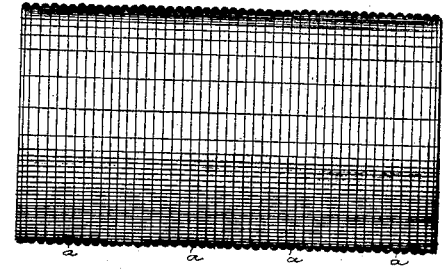

Figure 1 is an end view, and Fig. 2 is a side elevation of it.

The common leather-figuring tools made of agate usually require so much care in grooving and polishing them as to render them very expensive to the parties who use them, they costing, generally speaking, about fifty dollars apiece.

In carrying out my invention I make the tool, as a cylinder, A, of glass, with corrugations or creasing-ribs *a a a*, &c., extending entirely around its curved surface parallel to the ends of the cylinder, all as shown in the drawing; the said cylinder being formed in a mold by casting the glass in a molten state therein and powerfully compressing it into such mold, so as to enamel or glaze the surfaces of the corrugations, and impart to them the smoothing or fine polish necessary to enable them to be successfully used in the creasing or dicing of leather.

By so making the article it may be turned around in its supporter or holder from time to time, as occasion may require, in order to bring a fresh surface into use as parts may become worn. The article so made is believed to be an entirely new or improved manufacture for the purpose, and can be produced at a trifling expense in comparison to what an agate figuring-tool of ordinary kind usually costs. It is every way preferable to the agate-tool, which, when worn, has to be repaired or recut over before it can be used.

After the casting and pressing operations have been performed the article is to be slowly annealed so as not to affect the hardness of its operative surfaces.

The peculiar form of the figuring-tool enables it it be supported in its carrier to better advantage than the common agate-tool, the new tool being grasped diametrically, and the corrugations preventing any endwise movement of it in the carrier.

I claim—

As a new or improved manufacture, the cylindrical leather-figuring tool, made of glass, cast and pressed in a mold, and with corrugations or creasing-ribs extending around the curved surface of the article, and subsequently annealed, all being substantially as described, and for use as stated.

GEO. B. FOWLE.

Witnesses:
R. H. EDDY,
J. R. SNOW.